US012260887B1

(12) United States Patent
Kaplan

(10) Patent No.: US 12,260,887 B1
(45) Date of Patent: Mar. 25, 2025

(54) VOICE COIL MOTOR COMPOSITE MAGNET ASSEMBLY INCLUDING LOW-COERCIVITY MAGNETIC MATERIAL

(71) Applicant: Western Digital Technologies, Inc., San Jose, CA (US)

(72) Inventor: Brandon Kaplan, Woodinville, WA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/373,957

(22) Filed: Sep. 27, 2023

(51) Int. Cl.
*G11B 5/55* (2006.01)
*G11B 5/48* (2006.01)
*H02K 1/02* (2006.01)
*H02K 15/03* (2006.01)
*H02K 41/035* (2006.01)

(52) U.S. Cl.
CPC .......... *G11B 5/5521* (2013.01); *G11B 5/4813* (2013.01); *H02K 1/02* (2013.01); *H02K 15/03* (2013.01); *H02K 41/0354* (2013.01)

(58) Field of Classification Search
None
See application file for complete search history.

(56) References Cited

U.S. PATENT DOCUMENTS 3,984,706 A * 10/1976 Inouye .................. H01F 7/0289
310/12.08

8,064,171 B2 * 11/2011 Shimizu ............... G11B 25/043
360/264.8
11,423,930 B2    8/2022 Gao
(Continued)

FOREIGN PATENT DOCUMENTS

CN         1998125 B      6/2010
EP         1763042 A1     3/2007
(Continued)

OTHER PUBLICATIONS

Gao, Kaizhong et al., Composite Magnet Solution for High Performance Green Drive, Journal of Magnetism and Magnetic Materials, Feb. 15, 2023, 5 pages, vol. 568, ScienceDirect, Elsevier B.V.
(Continued)

*Primary Examiner* — William J Klimowicz
(74) *Attorney, Agent, or Firm* — John D. Henkhaus

(57) ABSTRACT

A voice coil motor (VCM) includes a coil, and on a first side a first yoke having a coil-side facing the coil, a first low-coercivity permanent magnet positioned between the coil and the coil-side of the first yoke and having a yoke-side facing the first yoke and a coil-side opposing the yoke-side, and a first high-coercivity permanent magnet adjoining the coil-side of the first low-coercivity magnet. A second side of the VCM on the opposing side of the coil is similarly configured. The permeance coefficient of such a VCM enables magnetic stability of low-coercivity magnetic materials. Additional high-coercivity permanent magnets may be bonded to the coil-sides of each of the first and second yokes and adjoining the yoke-sides of each of the low-coercivity permanent magnets, if the relative thicknesses of the magnet materials so dictate by design.

20 Claims, 4 Drawing Sheets

(56) References Cited

U.S. PATENT DOCUMENTS

| | | | |
|---|---|---|---|
| 2008/0053573 A1* | 3/2008 | Sakamoto | H01F 7/0221 |
| | | | 148/301 |
| 2008/0165451 A1 | 7/2008 | Binnard et al. | |
| 2009/0015968 A1* | 1/2009 | Xu | G11B 5/5569 |
| | | | 360/264.7 |
| 2009/0289508 A1* | 11/2009 | Sakamoto | H02K 41/0358 |
| | | | 310/12.26 |
| 2010/0109468 A1* | 5/2010 | Natsumeda | H02K 1/02 |
| | | | 310/156.43 |
| 2012/0242439 A1* | 9/2012 | Yoshida | H01F 41/026 |
| | | | 335/302 |
| 2013/0049910 A1* | 2/2013 | Tanaka | C22C 38/005 |
| | | | 148/284 |
| 2015/0028976 A1* | 1/2015 | Moriya | H01F 1/42 |
| | | | 335/302 |
| 2017/0278609 A1* | 9/2017 | Hagiwara | H01F 7/021 |
| 2019/0115125 A1* | 4/2019 | Tsubokura | H01F 1/057 |
| 2022/0139420 A1* | 5/2022 | Gao | H02K 1/02 |
| | | | 360/234.3 |
| 2022/0139603 A1 | 5/2022 | Gao | |
| 2024/0212707 A1* | 6/2024 | Kaplan | G11B 5/4806 |

FOREIGN PATENT DOCUMENTS

| | | | | |
|---|---|---|---|---|
| JP | 5310544 B2 | 10/2013 | | |
| WO | WO2004098024 A1 | 11/2004 | | |
| WO | WO-2008132801 A1 * | 11/2008 | | B22F 7/02 |

OTHER PUBLICATIONS

Hono, Kazuhiro, Magnetic Materials for Energy Saving, NIMS NOW International, Oct. 2010, 7 pages, vol. 8 No. 8, National Institute for Materials Science, downloaded at https://www.nims.go.jp/eng/publicity/nimsnow/2010/hdfqf100000081no-att/NIMS_NOW1008E.pdf.

Choi, Young-Man et al., Halbach Magnetic Circuit for Voice Coil Motor in Hard Disk Drives, Journal of Magnetics, Sep. 2010, Accepted Jul. 26, 2010, pp. 143-147, vol. 15 Issue 3, ResearchGate GmbH.

* cited by examiner

VOICE COIL MOTOR COMPOSITE MAGNET ASSEMBLY INCLUDING LOW-COERCIVITY MAGNETIC MATERIAL

FIELD OF EMBODIMENTS

Embodiments of the invention relate generally to voice coil motors, and particularly to a hard disk drive rotary voice coil actuator having a composite magnet assembly including a low-coercivity magnetic material.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") housed in a slider that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic-recording disk, which in turn magnetizes a small area on the recording medium.

Typically a voice coil motor ("VCM") is the type of actuator employed in HDDs to move the read-write head for accessing portions of a corresponding magnetic-recording disk for read and write operations. VCMs rely on permanent magnets for their own persistent magnetic fields. Such a field is typically strongest at the magnet surface and decreases with distance therefrom and, therefore, the magnetic flux density likewise decreases with distance from the magnet. Additionally, the cost of a permanent magnet is typically relative to the corresponding grade of the magnet and the material from which the magnet is made, with higher grades indicating stronger magnets. A rare-earth magnet is a strong permanent magnet made from alloys of rare-earth elements, e.g., typically neodymium magnets and samarium-cobalt magnets. Historically, rare-earth magnets have been implemented in HDD VCMs, as such magnets are the strongest type of permanent magnets made, producing significantly stronger magnetic fields than other types. In addition to price concerns, there are environmental concerns regarding rare-earth materials, as they are typically extracted from ores which can contain radioactive materials such as thorium, and extracting the required rare earths typically uses significant amounts of carcinogenic compounds like ammonia, hydrochloric acids, and sulphates. In view of the foregoing, alternatives to rare-earth magnetic materials for use in HDD VCMs may be desirable.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1:
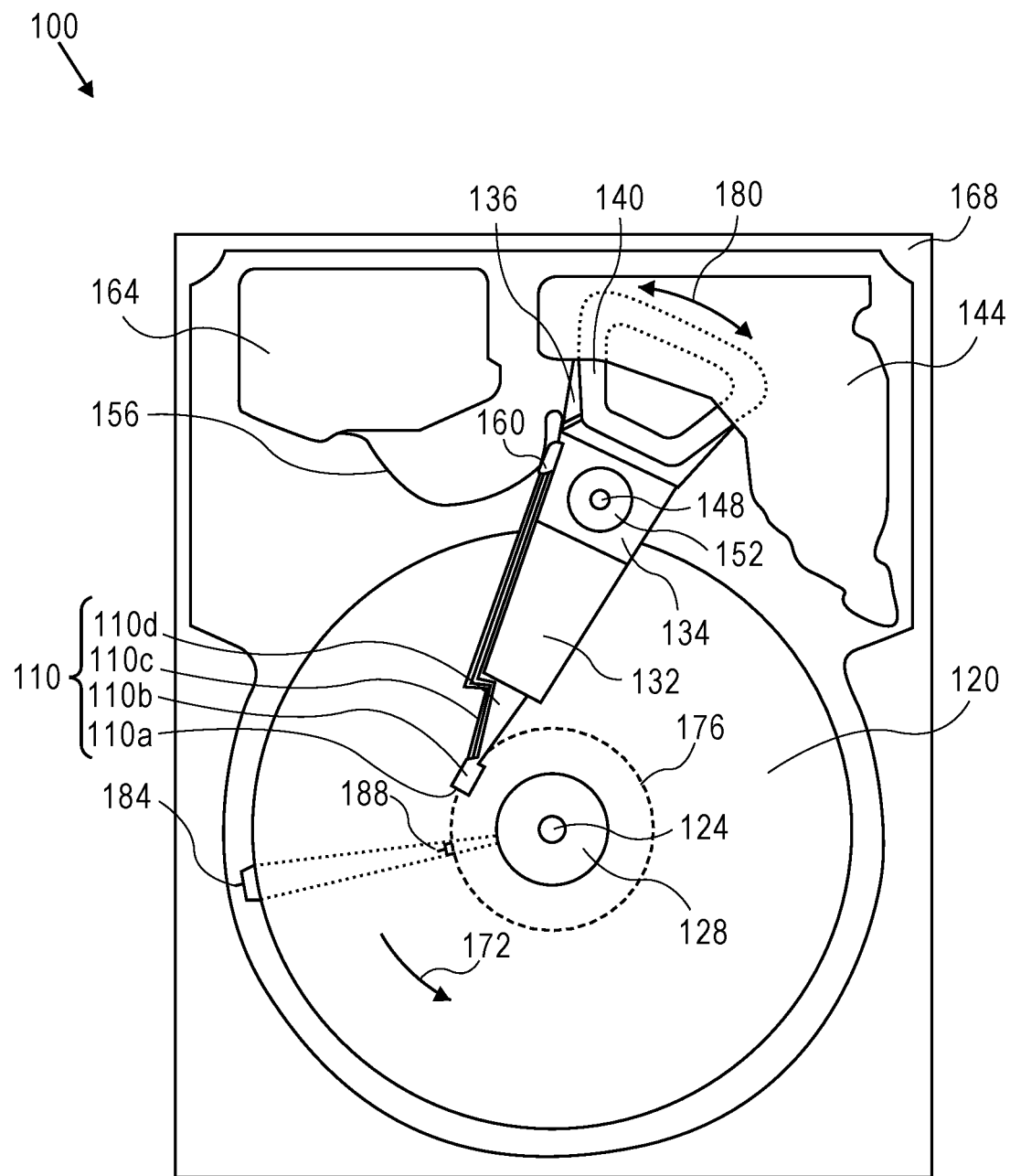
FIG. 1 is a plan view illustrating a hard disk drive (HDD), according to an embodiment.

Generally, approaches to a voice coil motor (VCM) actuator having a composite magnet assembly including a low-coercivity magnetic material, such as for use in a hard disk drive (HDD), are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that alternatives to rare-earth magnetic materials for use in HDD VCMs may be desirable. A new class of magnetic materials is entering the market, with certain rare earth materials reduced or eliminated. While capable of enabling significant performance, a weakness of these materials is a relatively low magnetic coercivity ($H_C$, i.e., a measure of the ability of a ferromagnetic material to withstand an external magnetic field without becoming demagnetized), in comparison to existing solutions. This property, combined with a relatively low permeance coefficient (Pc, i.e., a measure of the ratio of magnetic flux density $B_d$ and magnetic field strength $H_d$, equating to the operating point of the magnet on the B-H curve, or the "operating slope", or essentially the efficiency of the utilization of materials) of typical VCM designs poses a challenge to implementation of this new class of magnetic materials. Specifically, the low-coercivity magnetic materials are subject to risk of demagnetization in relatively low Pc applications, where the system Pc is largely dictated by the geometry of the system components, e.g., the pancake shape of a typical HDD VCM.

Composite Magnet Assembly for Voice Coil Motor

Thus, one challenge identified with respect to implementing low-coercivity magnetic materials in an HDD VCM is how to increase the permeance coefficient of such a VCM, to enable magnetic stability of these newer magnetic materials. According to an embodiment, the weakest region of the low-coercivity magnet(s) is effectively replaced with high-coercivity magnet(s), where the outer surface of the magnet is the weakest region in the context of Pc. Stated otherwise, this approach effectively replaces material in an area of instability (of the low-coercivity material) with a more stable, high-coercivity material.

Figure 2A:
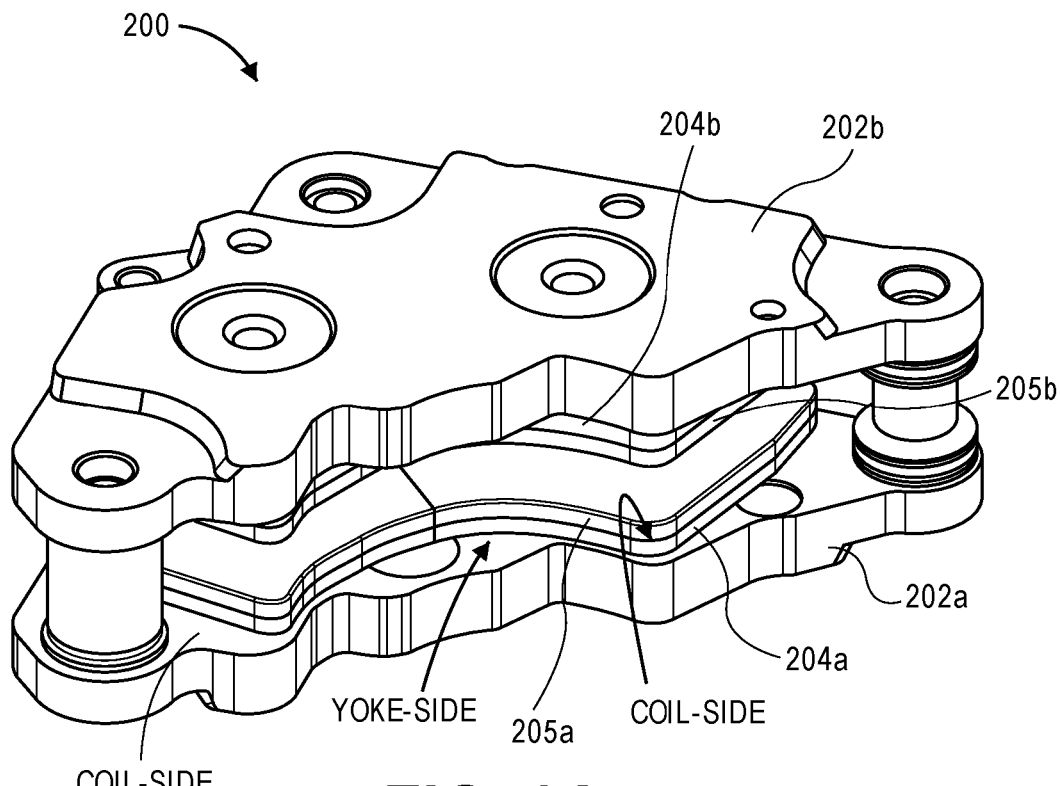
FIG. 2A is a perspective view illustrating a composite magnet assembly for a voice coil motor, according to an embodiment.
Figure 2B:
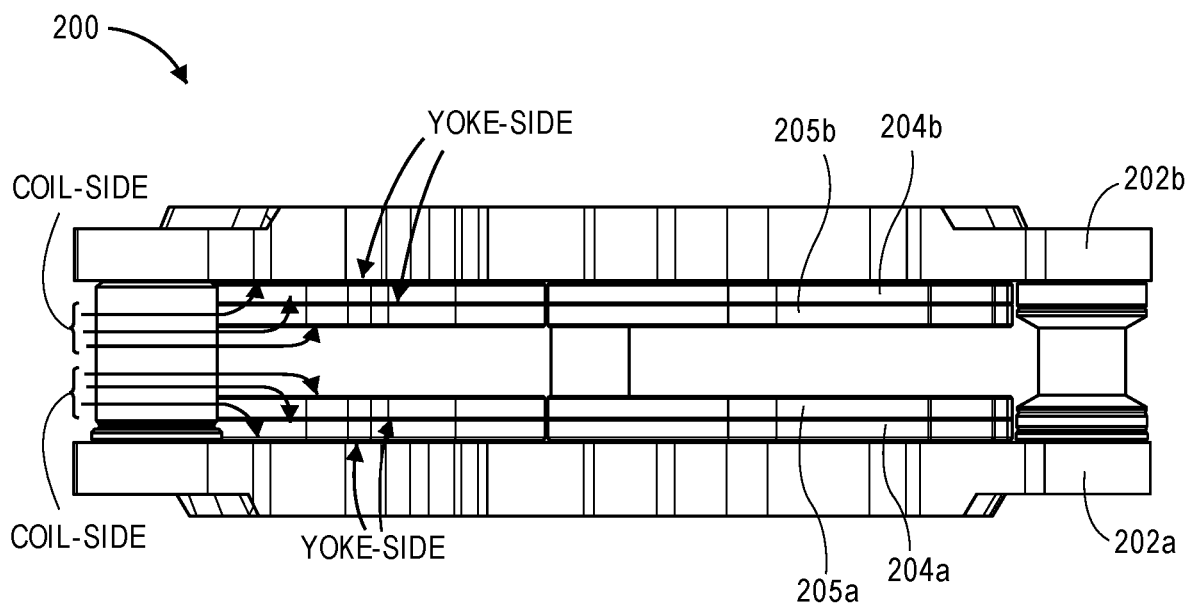
FIG. 2B is a side view illustrating the composite magnet assembly of FIG. 2A, according to an embodiment.

FIG. 2A is a perspective view illustrating a composite magnet assembly for a voice coil motor, and FIG. 2B is a side view illustrating the composite magnet assembly of FIG. 2A, both according to an embodiment. Assembly 200 comprises a first yoke 202a (e.g., a steel plate) having an air-side, or a coil-side facing the coil (not shown here) when installed, a first low-coercivity permanent magnet 204a positioned between the coil and the coil-side of the first yoke 202a and having a yoke-side facing the first yoke 202a and a coil-side opposing the yoke-side, and a first high-coercivity permanent magnet 205a adjoining the coil-side of the first low-coercivity magnet 204a. Similarly, the other side of the assembly 200 comprises a second yoke 202b having an air-side, or a coil-side facing the coil when installed, a second low-coercivity permanent magnet 204b positioned between the coil and the coil-side of the second yoke 202b and having a yoke-side facing the second yoke 202b and a coil-side opposing the yoke-side, and a second high-coercivity permanent magnet 205b adjoining the coil-side of the second low-coercivity magnet 204b. Each of the permanent magnets 204a, 205a, 204b, 205b comprises a permanent magnet magnetized to have a magnetic north pole and an adjacent magnetic south pole on respective sides of a boundary. Assembly 200 is designed to be constituent to a voice coil motor (VCM), such as for use in a hard disk drive (see, e.g., HDD 100 of FIG. 1), which would further comprise a coil (see, e.g., coil 306 of FIGS. 3A-3B) positioned between the two sides of the assembly 200. Thus, magnetic material volume in the weakest region of each relatively magnetically unstable low-coercivity magnet 204a, 204b is effectively replaced with magnetic material volume of the corresponding magnetically stable high-coercivity magnet 205a, 205b. A note of contrast with a Hallbach array magnet arrangement, a Hallbach array is configured to increase the magnetic field and, therefore, would harm/lessen the Pc contrary to an intended purpose of embodiments described herein. Additionally, a Hallbach array specifically requires magnetic component(s) whose field(s) is oriented roughly perpendicular to the field orientation of the primary magnets whereas here, according to embodiments, the high-coercivity magnetic field and the low-coercivity magnetic field are aligned.

For a non-limiting example, a "low-coercivity magnet" such as each low-coercivity magnet 204a, 204b refers to a permanent magnet having a magnetic normal coercivity ($H_{Cn}$) less than approximately 10,000 oersted (10 kOe) at ambient temperature, and a "high-coercivity magnet" such as each high-coercivity magnet 205a, 205b refers to a permanent magnet having a magnetic normal coercivity ($H_{Cn}$) greater than approximately 10,000 oersted (10 kOe) at ambient temperature. Furthermore, while the shape, profile, footprint of each high-coercivity magnet 205a, 205b preferably substantially covers the corresponding low-coercivity magnet 204a, 204b by area, the respective permanent magnet shapes are not necessarily identical and may vary from implementation to implementation. For example, material cost savings may be realized if the high-coercivity magnet has a slightly smaller footprint/profile than the low-coercivity magnet while maintaining suitability for the intended purpose, e.g., approximately 1 millimeter (mm) smaller around the high-coercivity magnet perimeter.

Figure 3A:
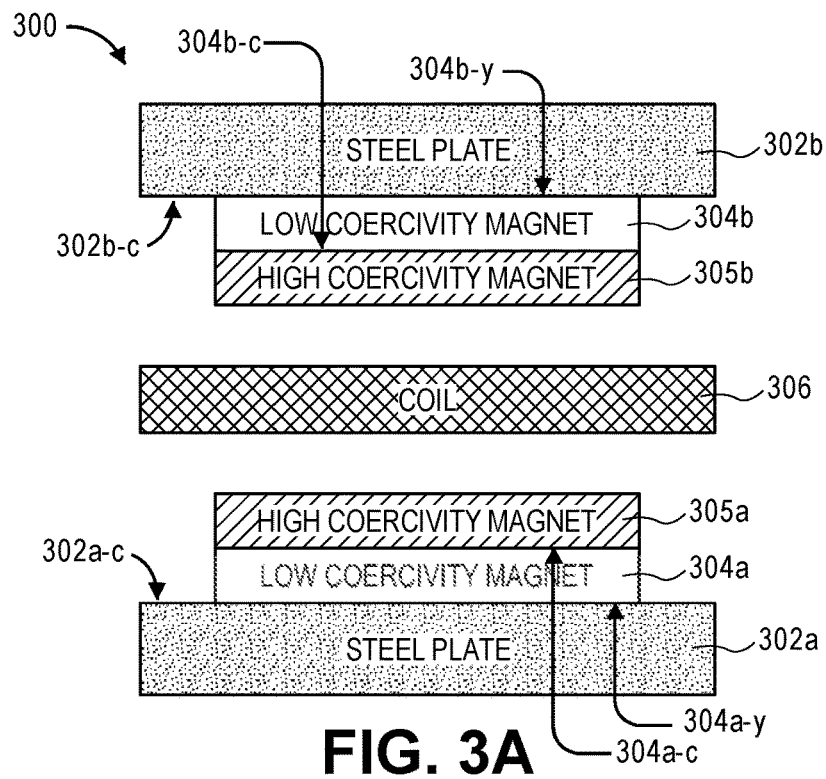
FIG. 3A is a side view diagram illustrating a single-skin composite magnet assembly for a voice coil motor (VCM), according to an embodiment.

FIG. 3A is a side view diagram illustrating a single-skin composite magnet assembly for a voice coil motor (VCM), according to an embodiment. Assembly 300 is generally referred to herein as a "single-skin" magnet assembly, as only a single high-coercivity magnet 205a, 205b is used to cover and augment the efficiency and stability of each corresponding low-coercivity magnet 204a, 204b, whereby single-skin assembly 300 is configured similarly to assembly 200 (FIGS. 2A-2B) and, likewise, assembly 200 is equivalently represented by the diagram of FIG. 3A. As such, assembly 300 comprises a first yoke 302a (e.g., a steel plate) having a coil-side 302a-c facing a coil 306, a first low-coercivity permanent magnet 304a positioned between the coil 306 and the coil-side 302a-c of the first yoke 302a and having a yoke-side 304a-y facing the first yoke 302a and a coil-side 304a-c opposing the yoke-side 304a-y, and a first high-coercivity permanent magnet 305a adjoining the coil-side 304a-c of the first low-coercivity magnet 304a. Similarly, the other side of the assembly 300 comprises second yoke 302b (e.g., a steel plate) having a coil-side 302b-c facing the coil 306, a second low-coercivity permanent magnet 304b positioned between the coil 306 and the coil-side 302b-c of the second yoke 302b and having a yoke-side 304b-y facing the second yoke 302b and a coil-side 304b-c opposing the yoke-side 304b-y, and a second high-coercivity permanent magnet 305b adjoining the coil-side 304b-c of the second low-coercivity magnet 304b. According to an embodiment, each of the first and second high-coercivity permanent magnets 305a, 305b comprises a rare-earth element (for non-limiting examples, neodymium-based alloys such as NdFeB or samarium-based alloys such as SmCo or SmFeN), and each of the first and second low-coercivity permanent magnets 304a, 304b comprises a non-rare-earth element (for non-limiting examples, iron nitride-based alloys or iron nickel-based alloys). Furthermore, each of the first and second low-coercivity permanent magnets 304a, 304b may comprise a reduced-rare-earth magnet, whereby a relatively small amount of rare earth material(s) (e.g., Nd) is still used but is largely/predominantly substituted with a different element and/or other rare-earth elements are eliminated and replaced with other elements. Note that the foregoing permanent magnet compositions are presented as non-limiting examples, as such types of low-coercivity permanent magnets are still under development.

Thus, according to an embodiment, the first low-coercivity permanent magnet 304a is bonded to (or adhered, attached or otherwise coupled to) the coil-side 302a-c of the first yoke 302a and the second low-coercivity permanent magnet 304b is bonded to (or adhered, attached or otherwise coupled to) the coil-side 302b-c of the second yoke 302b. Continuing and according to an embodiment, the first high-coercivity permanent magnet 305a is similarly bonded to the coil-side 304a-c of the first low-coercivity magnet 304a and the second high-coercivity permanent magnet 305b is similarly bonded to the coil-side 304b-c of the second low-coercivity magnet 304b.

With the single-skin embodiment of assembly 300, the Pc on the air side (also referred to as coil-side 304a-c, 304b-c) of each low-coercivity permanent magnet 304a, 304b is lower than the Pc on the steel side (also referred to as yoke-side 304a-y, 304b-y), which is an intrinsic feature of the magnetic circuit. At some point of an increasingly thicker high-coercivity permanent magnet 305a, 305b design (along with a commensurate increasingly thinner low-coercivity permanent magnet 304a, 304b maintaining total magnet thickness), the air-side of each low-coercivity permanent magnet 304a, 304b is no longer the limiting point (i.e., the Pc of the air-side surface becomes greater than the Pc of the yoke-side surface). Rather, the system would now be limited for stability purposes not at the interface of the low-coercivity/high-coercivity permanent magnets 304a/305a, 304b/305b but by the interface of each low-coercivity permanent magnet 304a, 304b and the corresponding steel plate (also referred to as yoke 302a, 302b). Hence, at this design point (for a non-limiting example, with a Pc approaching 1.2) a design limit is reached and, therefore, a double-skin or "sandwich" design is preferred, to continue improving the magnetic system stability.

Figure 3B:
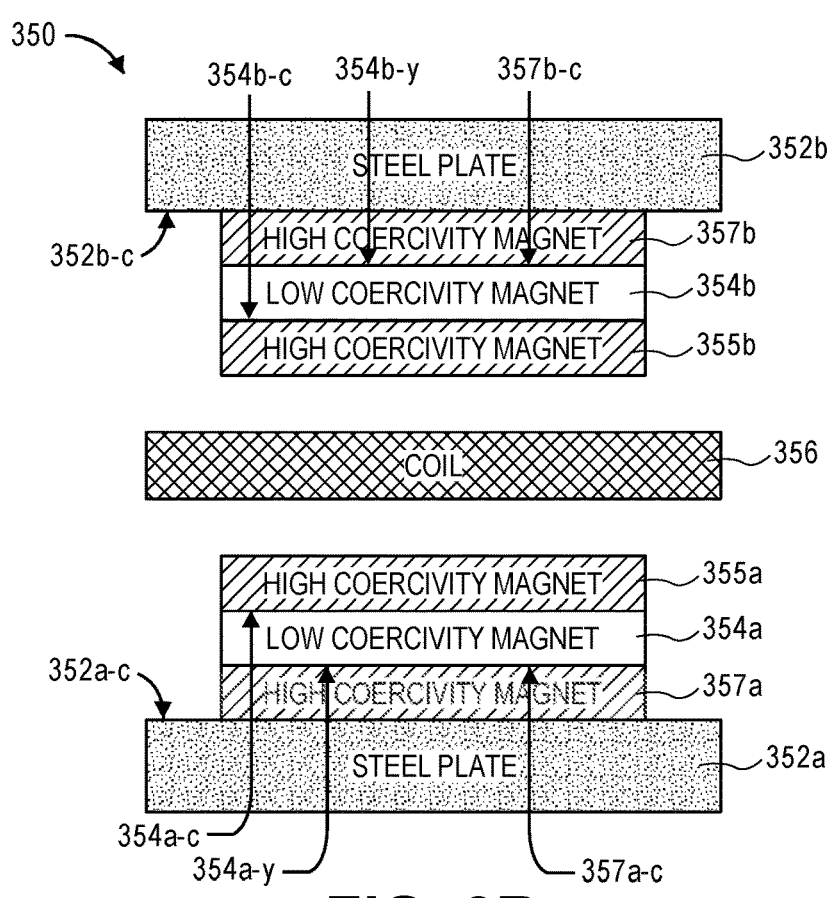
FIG. 3B is a side view diagram illustrating a double-skin composite magnet assembly for a voice coil motor (VCM), according to an embodiment.

FIG. 3B is a side view diagram illustrating a double-skin composite magnet assembly for a voice coil motor (VCM), according to an embodiment. Assembly 350 is generally referred to herein as a "double-skin" magnet assembly, as a pair of high-coercivity magnets 355a/357a, 355b/357b is used to sandwich and further augment the efficiency and stability of each corresponding low-coercivity magnet 354a, 354b. As such, assembly 350 comprises a first yoke 352a (e.g., a steel plate) having a coil-side 352a-c facing a coil 356, a first low-coercivity permanent magnet 354a positioned between the coil 356 and the coil-side 352a-c of the first yoke 352a and having a yoke-side 354a-y facing the first yoke 352a and a coil-side 354a-c opposing the yoke-side 354a-y, and a first high-coercivity permanent magnet 355a adjoining the coil-side 354a-c of the first low-coercivity magnet 354a. Similarly, the other side of the assembly 350 comprises second yoke 352b (e.g., a steel plate) having a coil-side 352b-c facing the coil 356, a second low-coercivity permanent magnet 354b positioned between the coil 356 and the coil-side 352b-c of the second yoke 352b and having a yoke-side 354b-y facing the second yoke 352b and a coil-side 354b-c opposing the yoke-side 354b-y, and a second high-coercivity permanent magnet 355b adjoining the coil-side 354b-c of the first low-coercivity magnet 354b.

According to an embodiment, assembly 350 further comprises a third high-coercivity permanent magnet 357a bonded (or adhered, attached or otherwise coupled to) to the coil-side 352a-c of the first yoke 352a and adjoining the yoke-side 354a-y of the first low-coercivity permanent magnet 354a, and a fourth high-coercivity permanent magnet 357b bonded (or adhered, attached or otherwise coupled to) to the coil-side 352b-c of the second yoke 352b and adjoining the yoke-side 354b-y of the second low-coercivity permanent magnet 354b. As such and according to an embodiment, the first low-coercivity permanent magnet 354a is bonded to a coil-side 357a-c of the third high-coercivity permanent magnet 357a and the second low-coercivity permanent magnet 354b is bonded to a coil-side 357b-c of the fourth high-coercivity permanent magnet 357b. Continuing and according to an embodiment, the first high-coercivity permanent magnet 355a is bonded to the coil-side 354a-c of the first low-coercivity permanent magnet 354a and the second high-coercivity permanent magnet 355b is bonded to the coil-side 354b-c of the second low-coercivity permanent magnet 354b.

With assembly 300 of FIG. 3A, with respect to the relative thicknesses of each low-coercivity permanent magnet 304a, 304b, 354a, 354b to each corresponding high-coercivity permanent magnet 305a, 305b, 355a/357a, 355b/357b, the majority of magnet volume remains with the respective low-coercivity permanent magnet 304a, 304b, 354a, 354b. For a non-limiting example, a suitable thickness ratio for a single-skin configuration can be approximately 25-33% high-coercivity permanent magnet (skin) to 67-75% low-coercivity permanent magnet (core). For another non-limiting example in the context of a double-skin configuration, a suitable thickness ratio can be approximately 33% for each of the high-coercivity and low-coercivity permanent magnets (each of the core and the two skins), up to approximately 50% for the low-coercivity permanent magnet (core). Beyond those high-coercivity permanent magnet thicknesses, this approach is considered to be less beneficial or of diminishing return.

Method of Assembling a Voice Coil Motor

Figure 4:
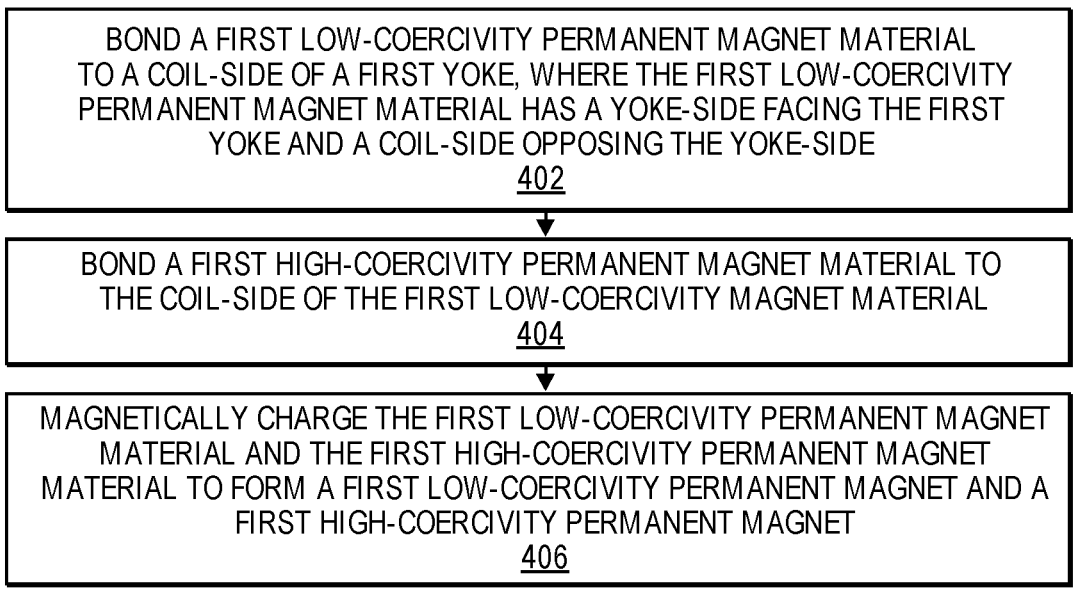
FIG. 4 is a flow diagram illustrating a method of assembling a voice coil motor, according to an embodiment.

FIG. 4 is a flow diagram illustrating a method of assembling a voice coil motor, according to an embodiment. For example, the method of FIG. 4 may be employed to assemble a VCM having composite magnets as illustrated and described elsewhere herein. Namely, the method of FIG. 4 may be employed to assemble a VCM having composite magnets 204a/205a, 204b/205b (FIGS. 2A-2B) and/or composite magnets 304a/305a, 304b/305b (FIG. 3A).

At block 402, bond a first low-coercivity permanent magnet material to a coil-side of a first yoke, where the first low-coercivity permanent magnet material has a yoke-side facing the first yoke and a coil-side opposing the yoke-side. For example, the material of first low-coercivity permanent magnet 204a (FIGS. 2A-2B), 304a (FIG. 3A) is bonded to the coil-side (FIGS. 2A-2B) 302a-c (FIG. 3A) of first yoke 202a (FIGS. 2A-2B), 302a (FIG. 3A), where the first low-coercivity permanent magnet material 204a, 304a has a yoke-side (FIGS. 2A-2B) 304a-y (FIG. 3A) facing the first yoke 202a, 302a and a coil-side (FIGS. 2A-2B) 304a-c (FIG. 3A) opposing the yoke-side 304a-y.

At block 404, bond a first high-coercivity permanent magnet material to the coil-side of the first low-coercivity magnet material. For example, the material of first high-coercivity permanent magnet 205a (FIGS. 2A-2B), 305a (FIG. 3A) is bonded to the coil-side 304a-c of the first low-coercivity magnet 204a, 304a.

At block 406, magnetically charge the first low-coercivity permanent magnet material and the first high-coercivity permanent magnet material to form a first low-coercivity permanent magnet and a first high-coercivity permanent magnet. For example, the material of first low-coercivity permanent magnet 204a, 304a and the material of first high-coercivity permanent magnet 205a, 305a are appropriately charged, as bonded to the first yoke 202a, 302a, to form the first low-coercivity permanent magnet 204a, 304a and the first high-coercivity permanent 205a, 305a.

Similarly, blocks 402-406 can be performed to assemble a similar half-assembly for the opposing magnet-yoke portion of a VCM, for assembly together with another similar half-assembly to form a VCM top-bottom pair.

Figure 5:
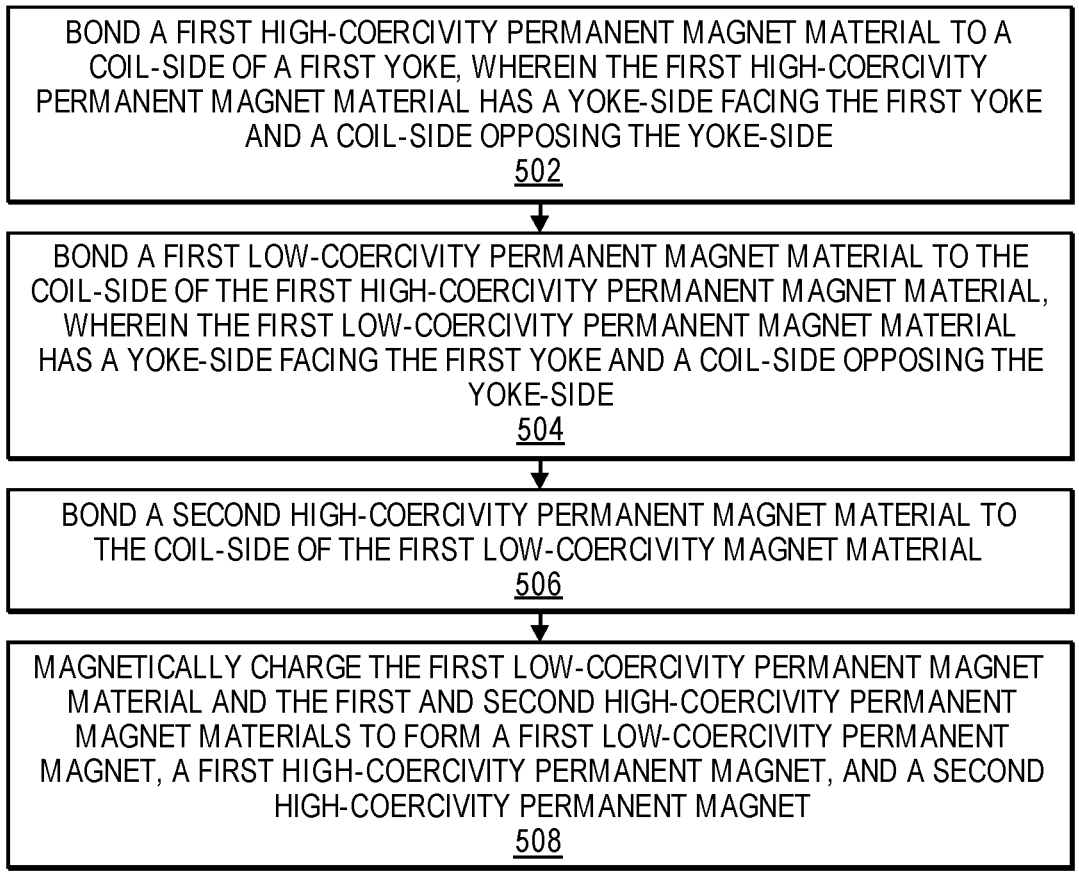
FIG. 5 is a flow diagram illustrating a method of assembling a voice coil motor, according to an embodiment.

FIG. 5 is a flow diagram illustrating a method of assembling a voice coil motor, according to an embodiment. For example, the method of FIG. 5 may be employed to assemble a VCM having composite magnets as illustrated and described elsewhere herein. Namely, the method of FIG. 5 may be employed to assemble a VCM having composite magnets 357a/354a/355a, 357b/354b/355b (FIG. 3B).

At block 502, bond a first high-coercivity permanent magnet material to a coil-side of a first yoke, wherein the first high-coercivity permanent magnet material has a yoke-side facing the first yoke and a coil-side opposing the yoke-side. For example, the material of first high-coercivity permanent magnet 357a (FIG. 3B) is bonded to the coil-side 352a-c (FIG. 3B) of first yoke 352a (FIG. 3B).

At block 504, bond a first low-coercivity permanent magnet material to the coil-side of the first high-coercivity permanent magnet material, wherein the first low-coercivity permanent magnet material has a yoke-side facing the first yoke and a coil-side opposing the yoke-side. For example, the material of the first low-coercivity permanent magnet 354a (FIG. 3B) is bonded to the material of the first high-coercivity permanent magnet 357a.

At block 506, bond a second high-coercivity permanent magnet material to the coil-side of the first low-coercivity magnet material. For example, the material of the second high-coercivity permanent magnet 355a (FIG. 3B) is bonded to the material of the first low-coercivity permanent magnet 354a.

At block 508, magnetically charge the first low-coercivity permanent magnet material and the first and second high-coercivity permanent magnet materials to form a first low-coercivity permanent magnet, a first high-coercivity permanent magnet, and a second high-coercivity permanent magnet. For example, the material of first low-coercivity permanent magnet 354a and the material of first and second high-coercivity permanent magnets 355a, 357a are appropriately charged, as bonded to the first yoke 352a, to form the first low-coercivity permanent magnet 354a and the first and second high-coercivity permanent magnets 355a, 357a.

Similarly, blocks 502-508 can be performed to assemble a similar half-assembly for the opposing magnet-yoke portion of a VCM, for assembly together with another similar half-assembly to form a VCM top-bottom pair.

With the foregoing approaches, magnetic material volume in the weakest region of each relatively magnetically unstable low-coercivity magnet is effectively replaced with magnetic material volume of a corresponding magnetically stable high-coercivity magnet. This enables implementing low-coercivity (e.g., non-rare-earth or reduced-rare-earth) magnetic materials in an HDD VCM, with associated cost and/or environmental savings, while maintaining a suitable permeance coefficient by enabling the magnetic stability of these newer magnetic materials.

Physical Description of Illustrative Operating Context(s)

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feedthrough provided by an HDD housing 168. The HDD housing 168 (or "enclosure base" or "baseplate" or "motor base assembly" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A voice coil motor (VCM) comprising:
a coil;
a first yoke having a coil-side facing the coil;
a first low-coercivity permanent magnet positioned between the coil and the coil-side of the first yoke and having a yoke-side facing the first yoke and a coil-side opposing the yoke-side;
a first high-coercivity permanent magnet adjoining the coil-side of the first low-coercivity permanent magnet;
a second yoke having a coil-side facing the coil;
a second low-coercivity permanent magnet positioned between the coil and the coil-side of the second yoke and having a yoke-side facing the second yoke and a coil-side opposing the yoke-side; and
a second high-coercivity permanent magnet adjoining the coil-side of the second low-coercivity permanent magnet.

2. The VCM of claim 1, wherein:
the first low-coercivity permanent magnet is bonded to the coil-side of the first yoke; and
the second low-coercivity permanent magnet is bonded to the coil-side of the second yoke.

3. The VCM of claim 2, wherein:
the first high-coercivity permanent magnet is bonded to the coil-side of the first low-coercivity permanent magnet; and
the second high-coercivity permanent magnet is bonded to the coil-side of the second low-coercivity permanent magnet.

4. The VCM of claim 1, further comprising:
a third high-coercivity permanent magnet bonded to the coil-side of the first yoke and adjoining the yoke-side of the first low-coercivity permanent magnet; and
a fourth high-coercivity permanent magnet bonded to the coil-side of the second yoke and adjoining the yoke-side of the second low-coercivity permanent magnet.

5. The VCM of claim 4, wherein:
the first low-coercivity permanent magnet is bonded to a coil-side of the third high-coercivity permanent magnet; and
the second low-coercivity permanent magnet is bonded to a coil-side of the fourth high-coercivity permanent magnet.

6. The VCM of claim 5, wherein:
the first high-coercivity permanent magnet is bonded to the coil-side of the first low-coercivity permanent magnet; and
the second high-coercivity permanent magnet is bonded to the coil-side of the second low-coercivity permanent magnet.

7. The VCM of claim 1, wherein:
each of the first and second high-coercivity permanent magnets has a magnetic normal coercivity ($H_{cn}$) greater than ten kilooersted (10 kOe) at ambient temperature; and
each of the first and second low-coercivity permanent magnets has a magnetic normal coercivity ($H_{cn}$) less than ten kilooersted (10 kOe) at ambient temperature.

8. A hard disk drive (HDD) comprising:
a plurality of disk media rotatably mounted on a spindle motor;
means for reading from and writing to at least one disk medium of the plurality of disk media; and
a voice coil motor (VCM) assembly configured for moving the means for reading and writing to access portions of the plurality of disk media, the VCM assembly comprising:
a coil,
a first yoke having a coil-side facing the coil,
a first low-coercivity permanent magnet positioned between the coil and the coil-side of the first yoke and having a yoke-side facing the first yoke and a coil-side opposing the yoke-side,
a first high-coercivity permanent magnet adjoining the coil-side of the first low-coercivity permanent magnet,
a second yoke having a coil-side facing the coil,
a second low-coercivity permanent magnet positioned between the coil and the coil-side of the second yoke and having a yoke-side facing the second yoke and a coil-side opposing the yoke-side, and
a second high-coercivity permanent magnet adjoining the coil-side of the second low-coercivity permanent magnet.

9. The HDD of claim 8, wherein:
the first low-coercivity permanent magnet is bonded to the coil-side of the first yoke; and
the second low-coercivity permanent magnet is bonded to the coil-side of the second yoke.

10. The HDD of claim 9, wherein:
the first high-coercivity permanent magnet is bonded to the coil-side of the first low-coercivity permanent magnet; and
the second high-coercivity permanent magnet is bonded to the coil-side of the second low-coercivity permanent magnet.

11. The HDD of claim 8, further comprising:
a third high-coercivity permanent magnet bonded to the coil-side of the first yoke and adjoining the yoke-side of the first low-coercivity permanent magnet; and
a fourth high-coercivity permanent magnet bonded to the coil-side of the second yoke and adjoining the yoke-side of the second low-coercivity permanent magnet.

12. The HDD of claim 11, wherein;
the first low-coercivity permanent magnet is bonded to a coil-side of the third high-coercivity permanent magnet; and
the second low-coercivity permanent magnet is bonded to a coil-side of the fourth high-coercivity permanent magnet.

13. The HDD of claim 12, wherein:
the first high-coercivity permanent magnet is bonded to the coil-side of the first low-coercivity permanent magnet; and
the second high-coercivity permanent magnet is bonded to the coil-side of the second low-coercivity permanent magnet.

14. The HDD of claim 8, wherein:
each of the first and second high-coercivity permanent magnets has a magnetic normal coercivity ($H_{cn}$) greater than ten kilooersted (10 kOe) at ambient temperature; and
each of the first and second low-coercivity permanent magnets has a magnetic normal coercivity ($H_{cn}$) less than ten kilooersted (10 kOe) at ambient temperature.

15. A method of assembling a voice coil motor (VCM), the method comprising:
forming a first half-assembly by:
bonding a first low-coercivity permanent magnet material to a coil-side of a first yoke, wherein the first low-coercivity permanent magnet material has a yoke-side facing the first yoke and a coil-side opposing the yoke-side;
bonding a first high-coercivity permanent magnet material to the coil-side of the first low-coercivity permanent magnet material; and
magnetically charging the first low-coercivity permanent magnet material and the first high-coercivity permanent magnet material to form a first low-coercivity permanent magnet and a first high-coercivity permanent magnet.

16. The method of claim 15, further comprising:
forming a second half-assembly according to the method of claim 15; and
assembling together the first half-assembly and the second half-assembly.

17. A voice coil motor assembled according to the method of claim 16.

18. A method of assembling a voice coil motor (VCM), the method comprising:
   forming a first half-assembly by:
      bonding a first high-coercivity permanent magnet material to a coil-side of a first yoke, wherein the first high-coercivity permanent magnet material has a yoke-side facing the first yoke and a coil-side opposing the yoke-side;
      bonding a first low-coercivity permanent magnet material to the coil-side of the first high-coercivity permanent magnet material, wherein the first low-coercivity permanent magnet material has a yoke-side facing the first yoke and a coil-side opposing the yoke-side;
      bonding a second high-coercivity permanent magnet material to the coil-side of the first low-coercivity permanent magnet material; and
      magnetically charging the first high-coercivity permanent magnet material, the first low-coercivity permanent magnet material, and the second high-coercivity permanent magnet material to form a first high-coercivity permanent magnet, a first low-coercivity permanent magnet, and a second high-coercivity permanent magnet.

19. The method of claim 18, further comprising:
   forming a second half-assembly according to the method of claim 18; and
   assembling together the first half-assembly and the second half-assembly.

20. A voice coil motor assembled according to the method of claim 19.

* * * * *